United States Patent [19]

Wohlert

[11] 4,045,243
[45] Aug. 30, 1977

[54] CARBON PAPER RECYCLING SYSTEM

[75] Inventor: Andrew M. Wohlert, St. Charles, Ill.

[73] Assignee: Riverbank Laboratories, Inc., Geneva, Ill.

[21] Appl. No.: 578,366

[22] Filed: May 19, 1975

[51] Int. Cl.² .................. B08B 3/10; B08B 3/12
[52] U.S. Cl. ........................... 134/1; 134/10;
134/25 R; 134/30; 134/39; 134/40; 134/60;
134/67; 134/108; 134/111; 134/151; 134/154;
134/155; 209/164; 209/170
[58] Field of Search ............ 134/1, 10, 25 R, 30,
134/34, 39, 40, 60, 61, 63, 67, 108, 111, 151,
154, 155, 182, 68, 74; 162/4; 209/11, 164, 170;
241/20

[56] References Cited
U.S. PATENT DOCUMENTS

| | | | |
|---|---|---|---|
| 1,732,180 | 10/1929 | Brogden | 134/68 X |
| 1,757,103 | 5/1930 | Voigt | 134/111 X |
| 2,617,435 | 11/1952 | Kessler | 134/108 X |
| 2,635,614 | 4/1953 | Ford | 134/155 X |
| 3,050,188 | 8/1962 | Nisser | 209/170 |
| 3,222,221 | 12/1965 | Branson | 134/1 |
| 3,849,197 | 11/1974 | Sorrentino | 134/10 |

Primary Examiner—S. Leon Bashore
Assistant Examiner—Richard V. Fisher
Attorney, Agent, or Firm—Edmond T. Patnaude

[57] ABSTRACT

The carbon-wax coating is removed from carbon paper by sequentially immersing the coated paper in hot aqueous baths, the paper being squeeze-dried prior to immersion in each bath after the first. Ultrasonic vibrations are applied to the first bath to mutually separate the individual pieces of the paper.

12 Claims, 2 Drawing Figures

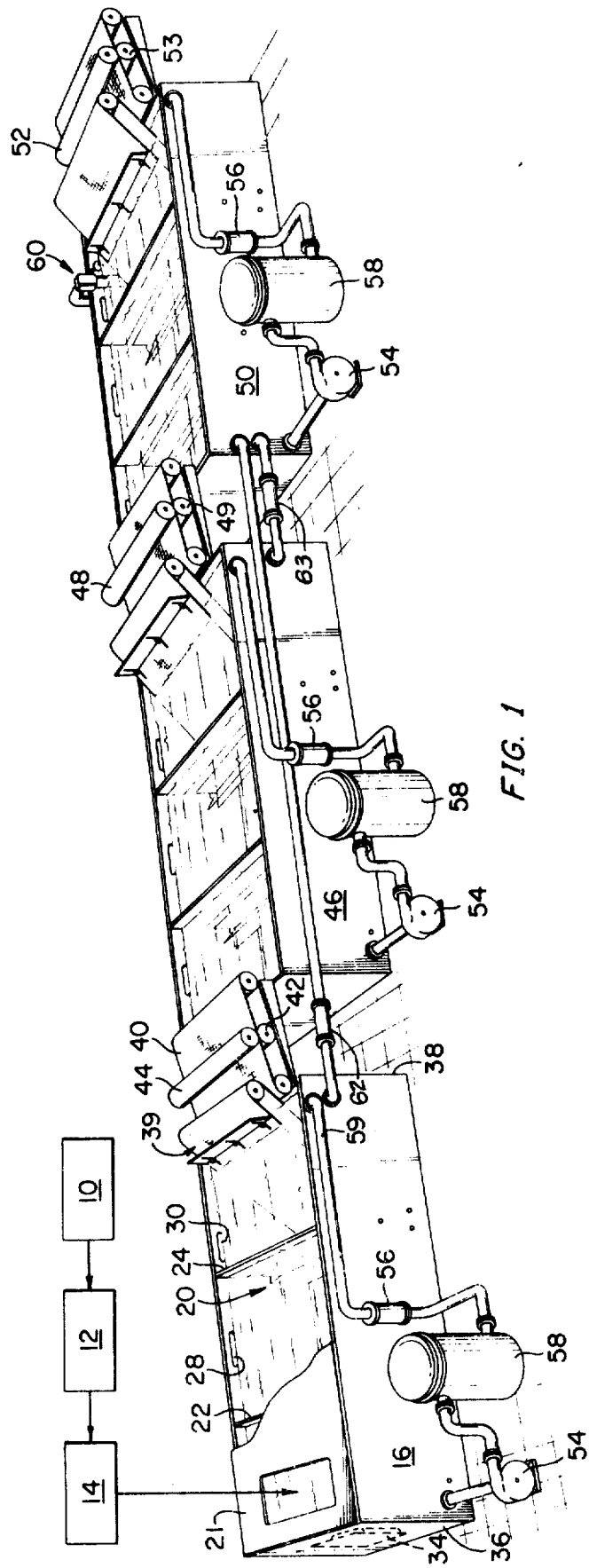
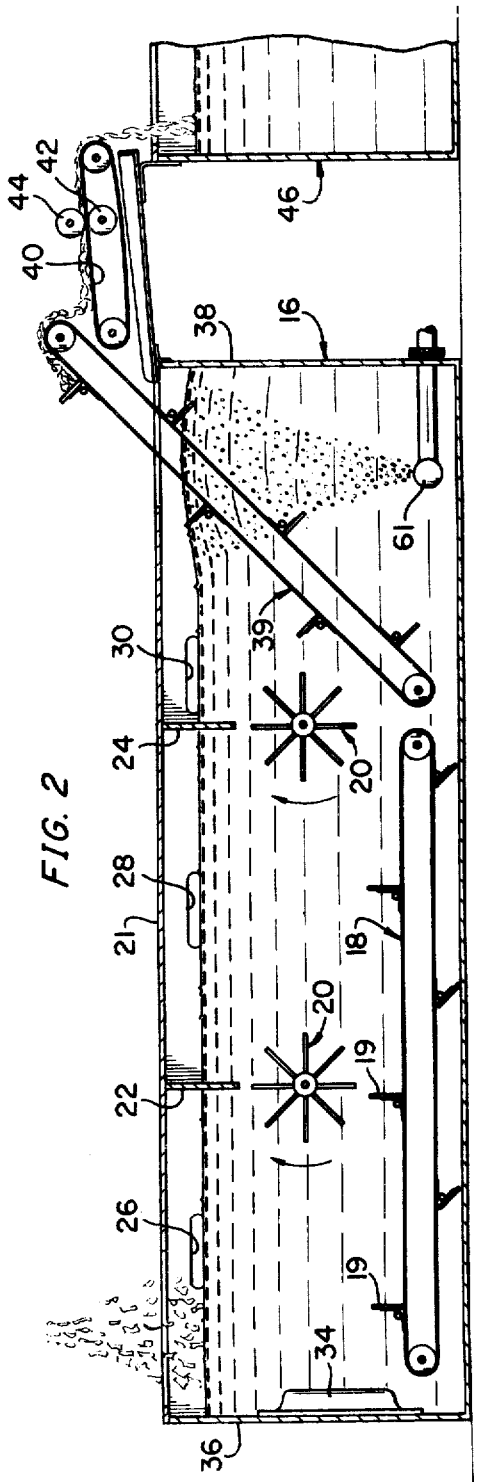
FIG. 1
FIG. 2

CARBON PAPER RECYCLING SYSTEM

The present invention relates to a method and apparatus for separating the carbon-wax coating from carbon paper to permit recycling of the paper stock.

BACKGROUND OF THE INVENTION

In the manufacture of carbon paper, large quantities of waste or scrap trimmings, sometimes in tightly wound rolls, as well as in imperfect full sheets result from the manufacturing process. Since no practical way has heretofore been found for reusing this waste material, it is now almost always burned or buried. The coated paper waste cannot be used as scrap paper for the manufacture of fresh paper stock because of the waxes and pigments in the coating. Attempts have been made to use degreasing solutions or solvents for the purpose of removing the coatings but such solutions are usually toxic and are difficult to remove from the saturated paper. Moreover, processes employing degreasing solutions are so costly as to make them unfeasible for economic reasons.

Unlike ordinary waxed paper and waxed board, carbon paper utilizes a high grade of paper whereby the value of the recovered paper is greater. However, carbon paper is inherently dirty because of the substantial amounts of carbon and other pigments contained in the coatings. Handling of the carbon paper and the separated wax and pigment therefore presents many problems which are not associated with the removal of wax coatings from waxed paper and waxed board wherefore those systems which have been used in the recycling of waxed paper cannot be satisfactorily used with carbon paper.

SUMMARY OF THE INVENTION

Briefly, there is provided in accordance with the teachings of the present invention a novel method and apparatus for removing the wax and pigment coating from carbon paper in a commercially practical manner. I have found that by continuously passing the waste paper through elongated tanks containing hot aqueous solutions and by squeeze-rolling the paper as it is transferred from one tank to the next, the wax and pigment can be removed to provide paper stock having a purity of nearly 99% so as to be recyclable for making carbon paper stock. By applying ultrasonic vibrations to the first tank, precut rolls of carbon paper as well as full sheets can be fed into the system without adversely affecting the quality of the final paper stock.

BRIEF DESCRIPTION OF THE DRAWING

Further objects and advantages and a better understanding of the present invention can be had by reference to the following detailed description, wherein:

FIG. 1 is a perspective view of a carbon paper recycling system embodying the present invention; and FIG. 2 is a vertical section of one of the tanks and squeeze roller sections of the system shown in FIG. 1.

DETAILED DESCRIPTION OF THE INVENTION

In accordance with the present invention, the carbon paper waste or scrap is passed through any suitable chopper 10 to chop the paper into small pieces no larger in size than about 6 inches by 6 inches. When the carbon paper waste is in rolls, the rolls should be cut in the longitudinal direction into two or more sections. The paper from the chopper 10 is tumbled in a first tumbler 12 and then carried as by air, to a second tumbler or beater 14 to separate the sheets as much as possible.

After separation, the paper is dropped into the front end of an elongated tank 16 containing, for example, 50,000 gallons of an aqueous solution of water and a wetting agent such as that sold by Turco Products under No. 3252. As more fully described hereinafter, this bath is maintained at a temperature of between about 170° F and 180° F if the bath is subjected to ultrasonic vibrations or about 200° F if ultrasonics are not used. The tank 16, which is preferably covered by a cover 21 to reduce loss of water through evaporation, should be relatively long and the paper is moved from left to right therein by a conveyor mechanism 18 employing a plurality of pivotally mounted spring loaded pusher plates 19 which pivot counterclockwise as the plates move toward the front of the tank and pivot clockwise into the illustrated pushing position as the plates move toward the rear of the tank. Since the present invention is not limited to a particular conveyor mechanism, the conveyor 18 is not described in detail herein, and it will be understood by those skilled in the art that any suitable conveyor can be used to move the paper from the inlet to the outlet end of the tank 16. Preferably, however, the conveyor 18 employs a perforate carrier through which the liquid in the associated tank can circulate.

In order to maintain the aqueous bath in the tank 16 in a state of agitation, a plurality of motor driven paddle wheels 20 are provided at submersed locations in the tank. A plurality of baffles 22 and 24 extend traversely across the tank. These baffles depend a short distance of about 6 inches below the surface of the bath to mutually separate the upper portions of the bath in the longitudinal direction. As the paper pieces move from the inlet end to the outlet end of the tank 16, the wax carrier and the pigment separate from the paper and float toward the surface of the bath. A plurality of wier openings 26, 28 and 30 are provided in the side wall 32 of the tank to permit the floating waxes and pigment to exit the tank. These wier openings may be adjustable so that for any particular run of paper the liquid flowing from the tank through the wiers may be primarily wax and pigment.

In order to permit the use of the system with all types of carbon paper waste including those wherein the paper sheets tenaciously cling together as in the tightly-wound roll sections, an ultrasonic vibrator 34 is mounted to the front end wall 36 of the tank 16 to establish ultrasonic wave motion at the inlet end of the bath. These ultrasonic vibrational waves cause mechanical separation of the sheets so that the dissolved waxes and the released pigment may be carried away from the paper. The vibrator 34 may be mounted at any other suitable position at the front of the tank 16.

A large percentage of the wax and pigment coating is removed from the paper in the tank 16 and most of that which is removed collects at the surface in the first two sections of the tank. Accordingly, the liquid surface between the baffle 24 and the rear end wall 38 of the tank is relatively clean so that when the partially cleaned paper is removed from the tank through this rear end portion of the tank, it does not pick up substantial amounts of wax and pigment. As described hereinafter, additional means are employed to ensure that the paper exiting the tank 16 is not contaminated.

The partially cleaned water saturated paper from the tank 16 is fed by an inclined conveyor 39 similar in construction to the conveyor 18 to a fabric web 40 which carries the paper through the nip of a pair of resilient squeeze rollers 42 and 44 which are motor driven to squeeze out about 90% of the water held by the paper. At the same time much of the dissolved wax and loose pigment is removed from the paper. After passing between the rollers 42 and 44 the squeezed-dried paper falls from the web 40 into the forward or inlet end of a second separating tank 46 which is identical in construction to the tank 16. The second separating tank 46 also contains a solution of water and a wetting agent at a temperature in the range of about 200° F to less than the boiling temperature. If the tank 46 were pressurized, temperatures exceeding the normal boiling temperature of the bath could be employed although I have not found this to be necessary.

After passing through the tank 46 the paper is again squeeze dried by passing it through a set of compression rolls 48 and 49 and dropped into a third tank 50 containing fresh water at a temperature between about 200° F and the boiling point. The tank 50 may also be of the same construction as the tanks 16 and 46 but for some applications it may not need to be as long in order to rinse out a sufficient percentage of the wetting agent. The rinsed paper from the tank 50 is passed through a third set of compression rollers 52 and 53 and then collected for reuse as scrap paper in the paper mmanufacturing process.

In order to maintain the baths in the tanks 16 and 46 at the required temperatures and to maintain the baths sufficiently clean to insure a recyclable paper product, the bath in each tank is circulated by means of a pump 54 through a heat exchanger 56 and a pressure leaf filter 58. Paper fibers and other entrained solids including carbon and other pigment particles are thus separated from the liquid. In place of the filter 58 a centrifugal separator may be used for this same purpose. It will be noted that the liquid is removed from the forward end of the tank and returned near the top at the rear end of the tank through a pipe 59 which extends transversely across the rear end of the tank and is perforated across the width of the tank to cause the surface flow of liquid in the tank away from the area through which the paper is removed. This return of the clean solution to the rear section of the tank maintains surface water in the section rearwardly of the baffle 24 relatively clean so that the paper being removed therefrom is not recontaminated.

As shown in FIG. 2 only, an inlet or bubble pipe 61 is perforated throughout its length and located at the rear of the tank 16 whereby the air bubbles emanating therefrom raise the level of water at the rear of the tank so that the wax and pigment floats forewardly away from the area where the paper exits the tank.

If desired auxiliary heaters may be provided at the rear ends of the tanks 16 and 46 to maintain the solution in an agitated state at the location where the paper is removed. The agitated liquid maintains the surface free from wax and pigment in the area through which the paper is removed.

Makeup water for each of the tanks 16 and 46 is supplied through check valves 62 and 63 respectively from the fresh water rinse tank 50. Fresh makeup water is supplied to the tank through a float operated control valve 60 whereby the liquid in the tanks 16, 46 and 50 remains at the same level. The check valves 62 and 63 prevent flow of contaminated water from tanks 16 and 46 into the rinse tank.

Each tank 16, 46 and 50 has a capacity of 25 gallons per pound of paper to be processed per hour. Therefore, for processing one ton of carbon paper per hour each tank should contain 50,000 gallons of solution. The average time for each piece of paper to remain in each tank is preferably about three minutes. A good length for each tank is about 100 feet, wherefore the paper travels in the tank at about ½ foot per second, a relatively slow speed.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A continuous process for removing the wax-carbon coating from carbon paper which coating comprises a wax which floats in water and pigment, comprising the steps of passing said carbon paper through a first aqueous bath having a temperature of between about 170° F and 200° F to cause some of said wax and pigment to separate from said paper, said bath comprising a solution of a wetting agent and water, mechanically agitating said bath, collecting and removing the wax which floats to the top of said bath, then passing said carbon paper through a squeezer to remove the major portion of the water therefrom, then passing the carbon paper through a second aqueous bath having a temperature in the range of about 200° F to less than the boiling point, said second aqueous bath comprising a solution of a wetting agent and water, collecting and removing the wax which floats to the top of said second bath, then removing the paper from said second tank, then squeezing the paper removed from said second tank to remove the major portion of the water therefrom, then passing the paper through a water rinse bath, and removing the paper from said rinse bath.

2. A process according to claim 1 wherein said baths contain entrained solids, comprising the step of continuously passing the liquid in each of said baths through a heater and a means for removing entrained solids therefrom.

3. A process according to claim 1 wherein said first bath is at a temperature in the range of about 170° F to 180° F, and applying ultrasonic vibrations to said first bath.

4. A process according to claim 3 comprising the step of passing said carbon paper through a chopper before immersing it in said first bath.

5. A process according to claim 1 comprising the steps of supplying fresh makeup water to said rinse bath, and supplying makeup water to each of said first and second baths from said rinse bath.

6. Apparatus for removing the wax-carbon coating from carbon paper, which coating contains wax and pigment which floats in water, comprising an elongated tank for containing heated water, a plurality of transverse baffles disposed in said tank near and above the surface of said water therein to separate said tank into a plurality of sections, conveyor means in said tank for causing carbon paper inserted in the front of said tank to be carried beneath said baffles toward the rear of said tank, means for removing said carbon paper through a surface area of said water near the rear end of said tank, and means for causing the level of liquid at said area to be higher than the liquid level in the adjacent portions of said tank so that any wax and pigment contained therein floats away from the area through which said paper is removed from said tank.

7. Apparatus according to claim 6 wherein said last named means comprises means for discharging air into said tank beneath said surface area through which said paper is removed from said tank.

8. Apparatus according to claim 6 comprising means for circulating the water in said tank through a heater and a filter.

9. Apparatus according to claim 8 comprising an ultrasonic vibrator mounted near the front of said tank.

10. A system comprising a plurality of tanks according to claim 6 arranged in seriatim, and means for removing paper from the rear of the first tank and feeding it to the front of the second tank.

11. Apparatus for removing the wax-carbon from carbon paper which coating contains wax and pigment which floats in water, comprising a plurality of elongated tanks for containing heated water, said tanks being arranged in seriatim, a plurality of transverse baffles disposed in each of said tanks in said water near and above the surface of said water therein to separate each of said tanks into a plurality of sections, conveyor means in said tanks for causing carbon paper inserted in front of said tanks to be carried beneath said baffles toward the rear of said tank, means for removing said carbon paper from said tanks near the rear end thereof, means for circulating the water in said tanks through a heater and a filter, and means interposed between said tanks for squeeze drying the paper removed from said first tank before it is fed to said second tank.

12. Apparatus according to claim 11 comprising a conduit interconnecting said tanks, and a check valve connected in said conduit for preventing the liquid in said first tank from flowing into said second tank.

* * * * *